United States Patent
Ellis et al.

[15] 3,666,256
[45] May 30, 1972

[54] ADJUSTABLE SHOCK ABSORBER

[72] Inventors: Larry C. Ellis; William J. Chorkey, both of Farmington; Robert J. Heideman, Detroit, all of Mich.

[73] Assignee: Ace Controls, Inc., Farmington, Mich.

[22] Filed: Dec. 4, 1969

[21] Appl. No.: 882,081

[52] U.S. Cl. ....................267/34, 188/311, 188/315, 188/322
[51] Int. Cl. .........................B60g 11/56, F16f 9/34
[58] Field of Search..................188/286, 287, 299, 322, 268, 188/269, 311, 315; 267/34

[56] References Cited

UNITED STATES PATENTS

| | | | |
|---|---|---|---|
| 3,425,522 | 2/1969 | Gryglas | 188/315 |
| 2,628,692 | 2/1953 | Hufferd | 188/286 X |
| 3,344,894 | 10/1967 | Kenworthy | 188/287 |
| 2,914,143 | 11/1959 | Focht | 267/34 X |
| 3,446,317 | 5/1969 | Gryglas | 188/315 X |

FOREIGN PATENTS OR APPLICATIONS

| | | | |
|---|---|---|---|
| 859,127 | 5/1940 | France | 188/88.5 |

*Primary Examiner*—George E. A. Halvosa
*Attorney*—Donnelly, Mentag & Harrington

[57] ABSTRACT

An adjustable fluid shock absorber including, a shock absorber body provided with an accumulator chamber and a piston chamber, a piston rod having its inner end slidably mounted in said piston chamber and its outer end extending outwardly of said body to an initial position for engagement by a member to be decelerated, fluid passage means between said accumulator chamber and said piston chamber, said chambers and passage means being filled with a fluid, a metering slot means interconnecting said fluid passage means with said piston chamber for metering the amount of fluid forced from said piston chamber to said accumulator chamber when a shock load is impressed on said piston rod, and, means for returning the piston rod to the initial position after a shock load is removed from the piston rod and for normally maintaining the piston rod in the initial position.

9 Claims, 13 Drawing Figures

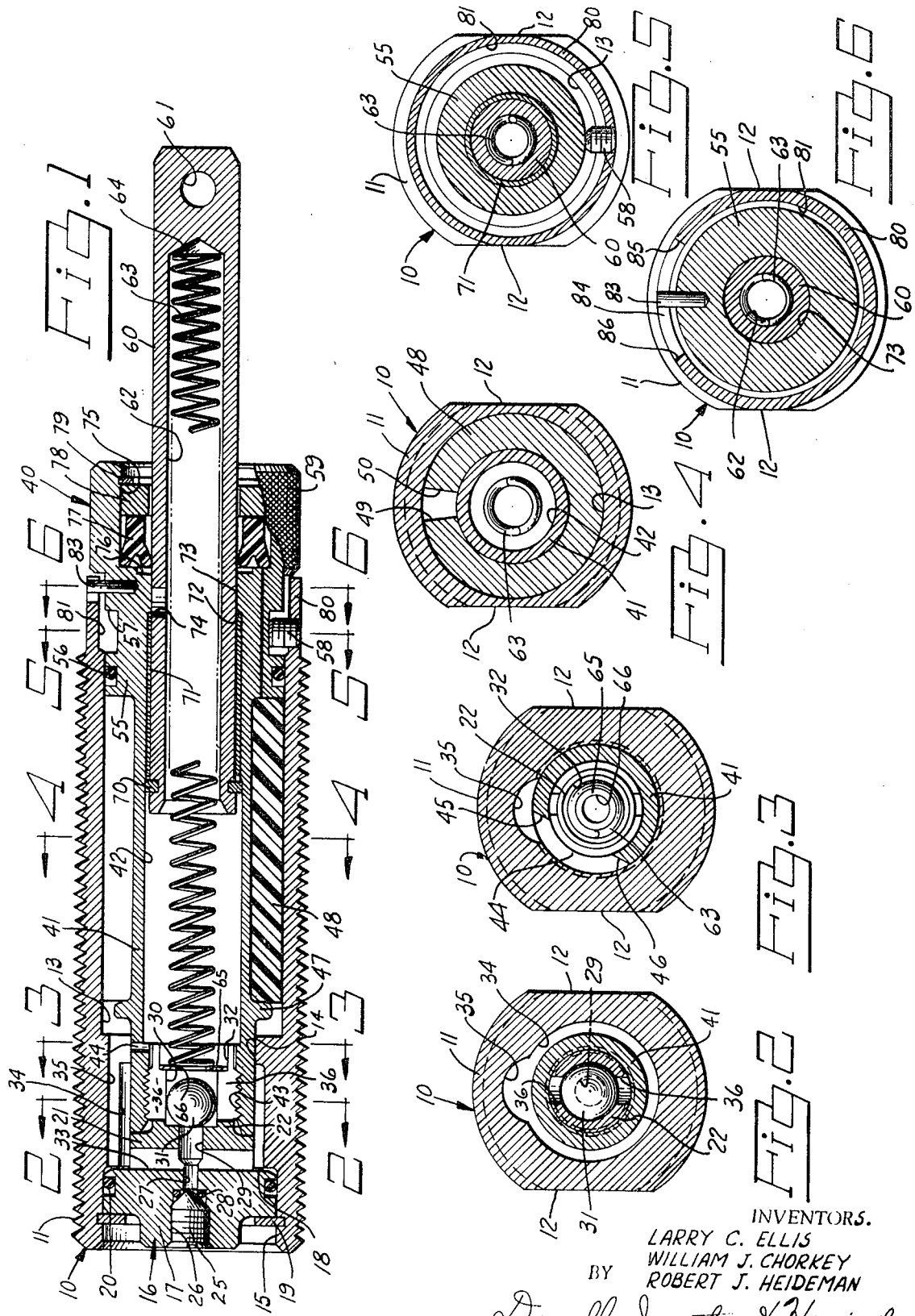

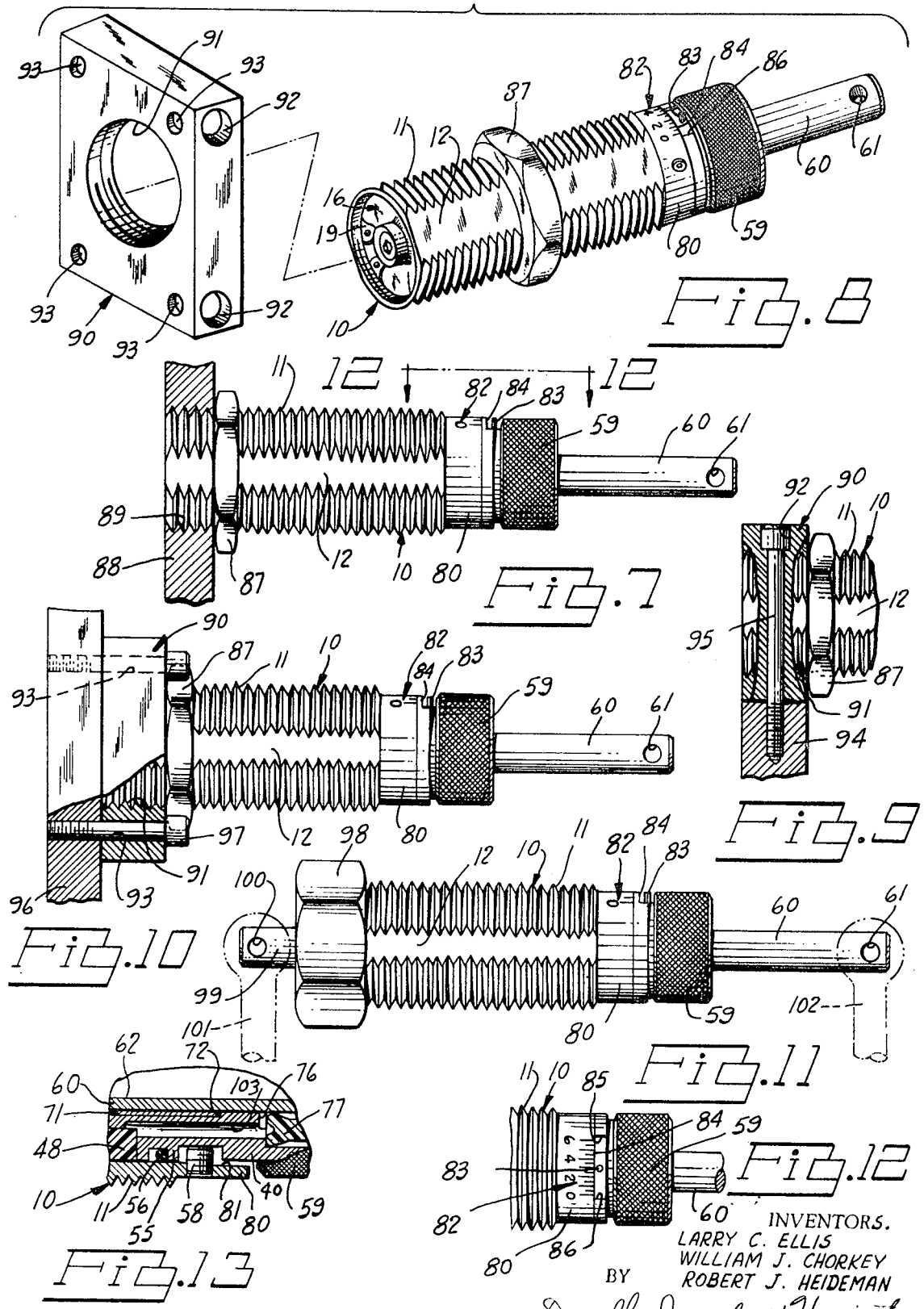

ADJUSTABLE SHOCK ABSORBER

SUMMARY OF THE INVENTION

This invention relates generally to shock absorbers, and more particularly, to a novel and improved adjustable shock absorber which provides a constant resistance force and substantially true linear deceleration.

Dashpots have been provided heretofore. However, a disadvantage of the prior art dashpots is that they do not provide linear deceleration. Prior art dashpots employ a round hole orifice with a needle-type of adjustment. The round hole creates a turbulent flow of hydraulic fluid and the pressure drop across the orifice is in a square relationship with the constantly changing velocity throughout a shock absorbing load, or stroke. Adjustable shock absorbers have been provided heretofore but they are costly and, accordingly, cannot economically provide a constant resistance decelerating action when such an operation is required. In view of the foregoing, it is an important object of the present invention to provide a novel and improved adjustable shock absorber which overcomes the aforementioned disadvantages of the prior art dashpots and adjustable shock absorbers.

It is another object of the present invention to provide a novel and improved adjustable shock absorber which provides a constant resistant force and which functions as a substantially true linear decelerator.

It is another object of the present invention to provide a novel and improved adjustable shock absorber which includes a metering slot means which provides a laminar, viscous flow of oil so as to provide a linear relationship between the pressure drop across the metering slot means and in accordance with the changing velocity of a shock load.

It is still another object of the present invention to provide a novel and improved adjustable shock absorber comprising, a shock absorber body provided with a fluid filled accumulator chamber and a fluid filled piston chamber, a shock receiving piston rod having its inner end slidably mounted in said piston chamber, fluid passage means between said accumulator chamber and said piston chamber, and, an adjustable metering slot means interconnecting said fluid passage means with said piston chamber for metering the amount of fluid forced from said piston chamber to said accumulator chamber when a shock load is impressed on said piston rod.

Other features and advantages of this invention will be apparent from the following detailed description, appended claims, and the accompanying drawings.

BRIEF DESCRIPTION OF THE DRAWINGS

FIG. 1 is a longitudinal, elevational section view of an adjustable hydraulic shock absorber made in accordance with the principles of the present invention.

FIG. 2 is an elevational section view of the shock absorber structure illustrated in FIG. 1, taken along the line 2—2 thereof, and looking in the direction of the arrows.

FIG. 3 is an elevational section view of the shock absorber structure illustrated in FIG. 1, taken along the line 3—3 thereof, and looking in the direction of the arrows.

FIG. 4 is an elevational section view of the shock absorber structure illustrated in FIG. 1, taken along the line 4—4 thereof, and looking in the direction of the arrows.

FIG. 5 is an elevational section view of the shock absorber structure illustrated in FIG. 1, taken along the line 5—5 thereof, and looking in the direction of the arrows.

FIG. 6 is an elevational section view of the shock absorber structure illustrated in FIG. 1, taken along the line 6—6 thereof, and looking in the direction of the arrows.

FIG. 7 is a side elevational view showing the shock absorber of the present invention directly installed in a tapped hole and locked in place with a mounting nut.

FIG. 8 is an exploded view showing a universal mounting block for use with the shock absorber of FIG. 1.

FIGS. 9 and 10 illustrate two uses of the universal mounting block illustrated in FIG. 8.

FIG. 11 illustrates the mounting of the shock absorber of the present invention by a clevis pin structure.

FIG. 12 is a fragmentary plan view of the shock absorber structure illustrated in FIG. 7, and showing the indicator pin and graduated dial means employed in the shock absorber of the present invention.

FIG. 13 is a fragmentary, elevational section view of a modified shock absorber made in accordance with the principles of the present invention.

DESCRIPTION OF THE PREFERRED EMBODIMENTS

Referring now to the drawings, and in particular to FIG. 1 wherein is shown an illustrative embodiment of the invention, the reference numeral 10 generally designates the fluid cylinder or body of a miniature, adjustable hydraulic decelerator or shock absorber. The body 10 of the shock absorber is substantially cylindrical in overall appearance and it is provided with threads 11 over its exterior length for operatively mounting the shock absorber in place. As best seen in FIGS. 2 and 8, the body 10 is provided with a pair of wrench flats 12. As shown in FIG. 1, the body 10 is provided with a main cylinder chamber or bore 13 that functions as an accumulator chamber. As shown in FIG. 1, the rear end of the body 10 is provided with the stepped bores 15, 34 and 14 which communicate with the cylinder bore 13.

Slidably mounted in the outer end bore 15 is an inner tube retainer generally indicated by the numeral 16. The retainer 16 encloses the rear end of the shock absorber body 10 and it includes an annular outer portion body 17 that is seated against the shoulder 18 which is formed between the bores 15 and 34. The retainer body portion 17 is releasably secured in place by a suitable releasable retainer ring 19. The retainer body portion 17 is provided on the periphery thereof with a suitable O-ring 20.

As shown in FIG. 1, the inner tube retainer 16 is provided with a first reduced diameter inner end portion 21 which is integrally formed on the inner side of the outer body portion 17, and a second integral inner end reduced diameter portion 22 which is formed on the inner end of the body portion 21. The outer periphery of the reduced body portion 22 is threaded.

As shown in FIG. 1, a set screw plug 25 is threadably mounted in a central, threaded axial bore 26 which is formed in the outer end of the retainer body portion 17. The inner end of the threaded bore 26 communicates through a reduced bore or passage 27 with an aligned, enlarged axial bore or passage 29. A suitable O-ring 28 is mounted in the inner end of the bore 26 for operative engagement with the inner pointed end of the set screw 25. The passage 29 is aligned with an enlarged axial bore 30 which is formed in the inner end body portion 22, and in which is operatively mounted a valve check ball 31. The bore 30 communicates with an axial aligned bore 32 formed in the outer end of the retainer body portion 22. The passage 29 communicates with the transverse passage 32 which, in turn, communicates with the axial bore 34 in the body 10.

As shown in FIGS. 1 and 2, the axial bore 34 communicates with the lower side of the longitudinally extended slot or passage 35 which is formed in the body 10. The inner end of the longitudinally extended passage 35 communicates with the cylinder bore or accumulator chamber 13. As shown in FIGS. 1 and 2, the bore 30 in the inner end of the retainer 16 communicates with two longitudinally extended slots 36 which are formed in the inner end portion 22 of the retainer.

As shown in FIG. 1, the shock absorber of the present invention is provided with an inner tube generally indicated by the numeral 40 which has a tubular inner end portion 41 extended into the front end of the body 10, into the accumulator chamber 13. The inner tube portion 41 is provided with an axial bore or chamber 42 which forms a high pressure chamber. The inner end of the tube portion 41 is threaded as indicated by the numeral 43 on the inner periphery thereof. As shown in FIG. 1, the retainer inner end portion 22 is threadably mounted into the inner tube threaded end portion 43.

As shown in FIGS. 1 and 3, the inner end of the tube portion 41 is also provided with a single arcuate metering slot 44 which communicates with the longitudinally extended slot 35 to communicate the high pressure chamber 42 with the accumulator chamber 13. The ends of the metering slot 44 are indicated in FIG. 3 by the reference numerals 45 and 46. The inner tube 41 is provided with a radially extended flange 47 which extends into the accumulator inner chamber 13 and forms a rear end abutment for an accumulator means 48 which comprises a closed cell sponge. The sponge 48 comprises a rectangular piece of compressible, cellular foam plastic which is wrapped around the tube 41, as shown in FIG. 4. The ends of the sponge 48 are indicated in FIG. 4 by the numerals 49 and 50.

As shown in FIG. 1, the inner tube 40 is provided with an enlarged, radially extended flange portion 55 on the outer end thereof which is slidably mounted in the front end of the accumulator chamber 13 and which is provided with a suitable O-ring 56 on the periphery thereof.

As shown in FIGS. 1 and 5, an annular groove 57 is formed in the inner tube flange 55. The front end of the body 10 is not threaded for a short portion 80 and this portion is counter-bored as indicated by the numeral 81 to a slightly larger bore than the accumulator chamber 13. A set screw 58 is threadably mounted in a suitable hole formed through the body portion 80 and the inner end thereof extends into the annular groove 57 for retaining the inner tube 40 in the body 10. It will be understood that the groove 57 is of a sufficient axial length to permit a predetermined amount of axial movement of the inner tube portion 41 in the body 10. The extreme outer end of the inner tube 40 is enlarged and is knurled, as indicated by the numeral 59 in FIG. 1.

As best seen in FIG. 1, a combination piston and piston rod 60 has its inner end slidably mounted in the inner tube 40. The outer end of the piston rod 60 is closed and is provided with a clevis pin hole 61. The piston rod 60 is provided with an axial bore 62 which is open at the inner end of the piston rod 60, and in which is received the outer end of a compression spring 63. The outer end of the compression spring 63 is seated against the end wall 64 of the bore 62. The inner end of the spring 63 is seated against a retainer ring 65 which is seated in the inner end of the bore 32 formed in the inner end portion 22 of the retainer 16.

As shown in FIG. 1, a suitable retainer ring 70 is mounted around the inner end of the piston rod 60 for retaining in place the inner end of a sleeve bearing 71. The sleeve bearing 71 is seated in the inner piston bore 42 and has its outer end seated against a shoulder 72 formed by the bore 42 and a reduced counter bore 73. A bleed passage 74 is formed through the wall of the piston rod 60 and communicates with the sleeve bearing 71. An enlarged counterbore 75 is formed in the inner tube enlarged portion 59, and the bore 75 communicates with the bore 73 and an intermediate counterbore 76. A suitable annular seal 77 is mounted in the bore 75 and is held in place by a back-up washer 78 which in turn is secured in place by a releasable retainer ring 79.

It will be seen that when the inner tube 40 is rotated in the clockwise direction as viewed in FIG. 3, the metering slot 44 will be increasingly opened or exposed to the slot 35, and that when the inner tube 40 is rotated in the counterclockwise direction as viewed in FIG. 3, that the metering slot 44 will be decreasingly closed to the slot 35 until communication between these two slots is closed and the shock absorber is then in a locked position.

In order to indicate the relative positions of the metering slot 44, relative to the slot 35, the shock absorber is provided with an indicator means comprising a set of indicia as numbers 82, shown in FIGS. 8 and 12, on the outer periphery of the body front end portion 80. A cooperating indicating pin 83 is mounted in the enlarged flange portion 55 of the inner tube 40 and it is positioned relative to the slot 44 to show the relative position of the slot 44 with the slot 35. The indicator pin 83 extends radially outward from the inner tube flange portion 55 and its outer end extends into an arcuate annular slot 84 formed in the body portion 80. As shown in FIG. 6, the ends of the arcuate slot 84 are indicated by the numerals 85 and 86.

FIG. 7 illustrates the mounting of the shock absorber in a stationary member indicated by the numeral 88. The rear end of the threaded body 10 is shown as being threadably mounted in a threaded hole 89 formed in the member 88. The shock absorber body 10 is locked in position by the mounting nut or jam nut 87.

A universal mounting block 90 is shown in FIG. 8 for use in mounting the shock absorber of the present invention a number of different positions. The mounting block 90 is provided with a plurality of mounting bolt holes 93 along the longitudinal axis of the mounting block and parallel to the threaded hole 91 in which the rear end of the threaded body 10 may be mounted. The block 90 is also provided with a pair of transverse mounting bolt holes 92.

FIG. 9 shows the body 10 threaded in the hole 91 and secured in place by the mounting nut 87. The block 90 is shown as being secured to a stationary member 94 by suitable mounting bolts 95 mounted in the mounting holes 92.

FIG. 10 shows the shock absorber threadably mounted in the mounting block hole 91 and secured in place by the mounting nut 87. In this illustration, the mounting block 90 is secured to a stationary member 96 by a plurality of mounting bolts 97 mounted through the mounting holes 93.

FIG. 11 shows the mounting of the shock absorber of the present invention by a clevis structure means. As shown in FIG. 11, the threaded body 10 is provided on the rear end thereof with a threadably mounted clevis member 98 which is provided with an axially extended shaft 99. The shaft 99 is provided with a clevis pin hole 100 for operative attachment to a clevis member 101. A second clevis member 102 is illustrated as being operatively mounted to the piston rod 60 of the shock absorber.

FIG. 13 illustrates a modified shock absorber made in accordance with the principles of the present invention and which is provided with a longitudinally extended pressure relief passage 103. Passage 103 is formed in the inner tube 40 and communicates the front end of the accumulator chamber 13 with the seal bore 75 for relieving any high pressure in the bore 75.

OPERATION

In operation, the shock absorber would be positioned so that the outer end of the piston rod 60 is in the path of a moving member or weight which is to be decelerated. The accumulator chamber 13 is filled with suitable hydraulic fluid and any necessary bleeding operation is carried out by means of the set screw 25. The return spring 63 moves the piston rod 62 to the initial shock absorbing position shown in FIG. 1. The inner tube 40 is adjusted to the desired opening of the metering slot 44 and the shock absorber then is in a ready or operative position for decelerating a shock load. When a moving member to be decelerated engages the outer end of the piston rod 60, the fluid in the high pressure or piston chamber 42 is forced through the metering slot 44 into the passage 35 and thence into the accumulator chamber 13. The resistance to fluid flow caused by the metering slot 44 governs the shock absorber's internal pressures which generate resisting forces to stop the load. The valve check ball 31 closes the passage 29. The fluid continues to pass into the accumulator chamber 13 until the entire stroke or displacement of the piston rod 60 is carried out. The sponge 48 contracts to provide additional volume for the fluid displaced by the piston rod 60. When the weight on the piston rod is released, the return spring 63 returns the piston rod to the right, as viewed in FIG. 1, to the initial operative position. The sponge 48 expands and the fluid under pressure in the accumulator chamber 13 will be forced back through the slot 35 and into the passages 33 and 29 and against the valve check ball 31 to force the valve check ball 31 off of its seat and to permit the fluid to pass back through the bore 30, the slots 36 and the bore 32 into the piston chamber 42.

The adjustable hydraulic decelerator or shock absorber of the present invention is made in a small and compact structure. It is designed for industrial speed control and motion-arresting applications. In one embodiment, the decelerator piston chamber 42 had a ⅝ inch bore, and the stoke of the piston rod 60 was 1 inch. The aforementioned embodiment had energy absorbing capacity up to 300 inch lbs. The shock absorber of the present invention is completely self-contained and it has an infinitely adjustable energy-absorbing capacity.

It will be understood that the shock absorber of the present invention may be made to any desired energy-absorbing capacity. The load speed and degree of cushioning is controlled by adjusting the inner tube 40, as desired. The graduated dial 82 cooperates with the pin 83 to provide means for properly setting the shock absorber for any desired application and to insure repeatable performance. The shock absorber of the present invention provides mechanical reliability because the novel structure eliminates the need for any separate piston and rod diameters because of the combined rod and piston rod structure 60. Only one dynamic seal is required with the novel shock absorber structure of the present invention.

The shock absorber of the present invention provides true linear deceleration as compared to the prior art dashpots. The prior art dashpots have a round hole orifice with a needle type of adjustment. The round hole orifice creates a turbulent flow of oil and the pressure drop across the orifice is in a square relationship to the constantly changing velocity throughout a working stroke. The shock absorber of the present invention is provided with a metering orifice slot that provides a laminar, viscous flow of oil and the pressure drop across the slot is in a linear relationship to the changing velocity. The metering orifice slot 44 provides a low level of reaction force as compared to an ordinary dashpot.

While it will be apparent that the preferred embodiments of the invention herein disclosed are well calculated to fulfill the objects above stated, it will be appreciated that the invention is susceptible to modification, variation and change.

What is claimed is:

1. In an adjustable fluid shock absorber, the combination comprising:
   a. a shock absorber body provided with an accumulator chamber and a piston chamber;
   b. a piston rod having its inner end slidably mounted in said piston chamber and its outer end extending outwardly of said body to an initial position for engagement by a member to be decelerated;
   c. longitudinal fluid passage means between said accumulator chamber and said piston chamber and including a metering slot of constant cross section and extending transversely of the axis of said piston chamber;
   d. said chambers and said fluid passage means having a fluid therein; and,
   e. a rotatably adjustable arcuate metering slot means directly interconnecting said fluid passage means metering slot and said piston chamber for metering fluid forced from said piston chamber through said fluid passage means to said accumulator chamber with only one 90° turn of the metering fluid after the fluid leaves the piston chamber when a shock load is impressed on said piston rod.

2. An adjustable fluid shock absorber as defined in claim 1, wherein:
   a. said shock absorber is provided with a rotatably adjustable inner tube in which is formed said piston chamber;
   b. said arcuate metering slot means comprises an arcuate slot formed in the periphery of said inner tube and communicating said piston chamber with said fluid passage means metering slot and operative to control the flow of fluid through said last named metering slot; and,
   c. said piston rod is slidably mounted in said piston chamber in said inner tube means.

3. An adjustable fluid shock absorber as defined in claim 2, including:
   a. compressible sponge means operatively mounted in said accumulator chamber.

4. An adjustable fluid shock absorber as defined in claim 2, including:
   a. a seal means carried by said inner tube in an annular chamber for sealing engagement with said piston rod.

5. An adjustable fluid shock absorber as defined in claim 4, including:
   a. a relief passage interconnecting said accumulator chamber and said seal means annular chamber.

6. An adjustable fluid shock absorber as defined in claim 2, including:
   a. means for returning the piston rod to the initial position after a shock load is removed from the piston rod and for normally maintaining the piston rod in the initial position.

7. An adjustable fluid shock absorber as defined in claim 5, wherein:
   a. said means for returning the piston rod to the initial position comprises a spring means.

8. An adjustable fluid shock absorber as defined in claim 7, wherein:
   a. said piston rod has an axial bore extending inwardly from the inner end, and said spring means has one end thereof seated in said bore.

9. An adjustable fluid shock absorber as defined in claim 6, wherein:
   a. said fluid passage means includes a fluid return passage for returning the fluid from the accumulator chamber to the piston chamber; and,
   b. a check valve in said fluid return passage of the fluid passage means to close said fluid return passage during a shock absorbing operation.

* * * * *